(12) United States Patent (10) Patent No.: US 8,967,129 B2
Mueller (45) Date of Patent: Mar. 3, 2015

(54) DUCTED COMBUSTION CHAMBER FOR DIRECT INJECTION ENGINES AND METHOD

(75) Inventor: Charles Mueller, Livermore, CA (US)

(73) Assignee: Caterpillar Inc., Peoria, IL (US)

( * ) Notice: Subject to any disclaimer, the term of this patent is extended or adjusted under 35 U.S.C. 154(b) by 1155 days.

(21) Appl. No.: 13/014,154

(22) Filed: Jan. 26, 2011

(65) Prior Publication Data

US 2012/0186555 A1 Jul. 26, 2012

(51) Int. Cl.
*F02F 3/24* (2006.01)
*F02B 3/00* (2006.01)

(52) U.S. Cl.
CPC .......................................... *F02B 3/00* (2013.01)
USPC ........... 123/659; 123/661; 123/298; 123/305; 123/193.4

(58) Field of Classification Search
USPC ........................ 123/193.4, 298, 305, 659, 661
See application file for complete search history.

(56) References Cited

U.S. PATENT DOCUMENTS 6,748,872 B2 * 6/2004 Parrish .......................... 123/305

FOREIGN PATENT DOCUMENTS

| DE | 894338 C1 | 10/1953 |
| FR | 2880915 A1 | 7/2006 |
| JP | 1976042311 U | 3/1976 |
| JP | 1991286124 A | 12/1991 |
| JP | 1993086864 A | 4/1993 |
| JP | 1993272338 A | 10/1993 |
| JP | 1993296045 A | 11/1993 |
| JP | 2002276373 A | 9/2002 |
| JP | 2004308449 A | 11/2004 |

* cited by examiner

*Primary Examiner* — Erick Solis
(74) *Attorney, Agent, or Firm* — Leydig, Voit & Mayer, Ltd.

(57) ABSTRACT

An internal combustion engine includes an engine block having a cylinder bore and a cylinder head having a flame deck surface disposed at one end of the cylinder bore. A piston connected to a rotatable crankshaft and configured to reciprocate within the cylinder bore has a piston crown portion facing the flame deck surface such that a combustion chamber is defined within the cylinder bore and between the piston crown and the flame deck surface. A fuel injector having a nozzle tip disposed in fluid communication with the combustion chamber has at least one nozzle opening configured to inject a fuel jet into the combustion chamber along a fuel jet centerline. At least one duct defined in the combustion chamber between the piston crown and the flame deck surface has a generally rectangular cross section and extends in a radial direction relative to the cylinder bore substantially along the fuel jet centerline.

13 Claims, 5 Drawing Sheets

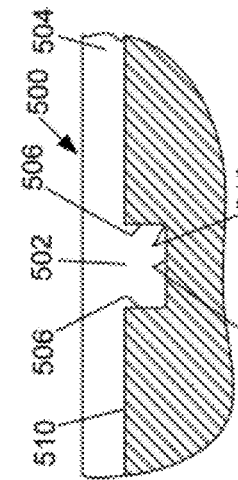
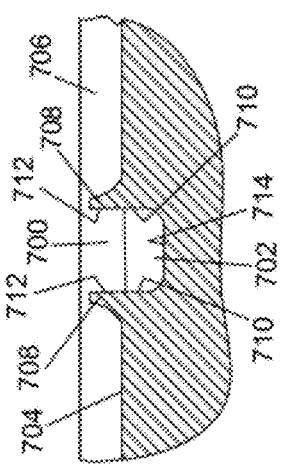
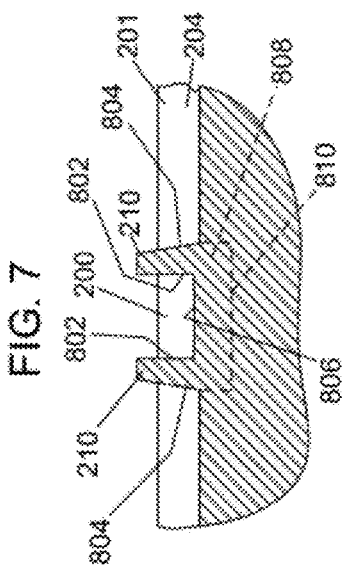
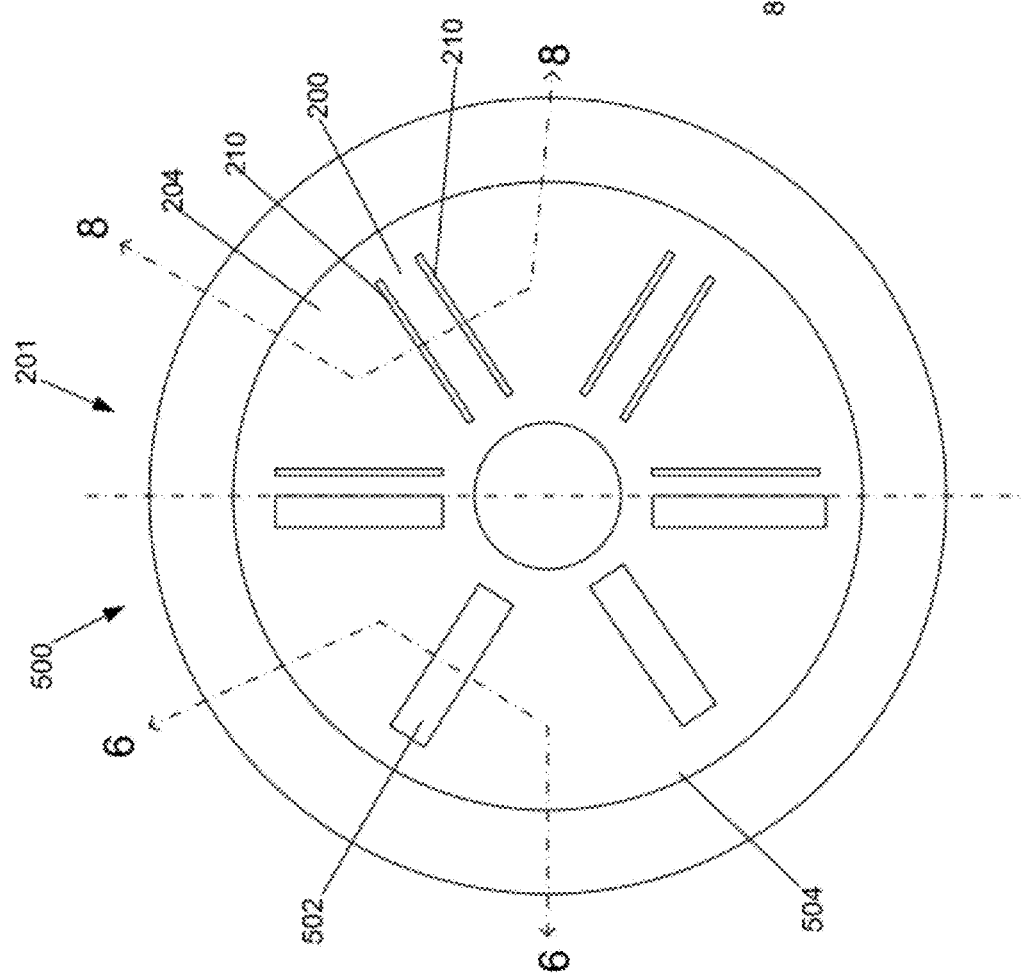

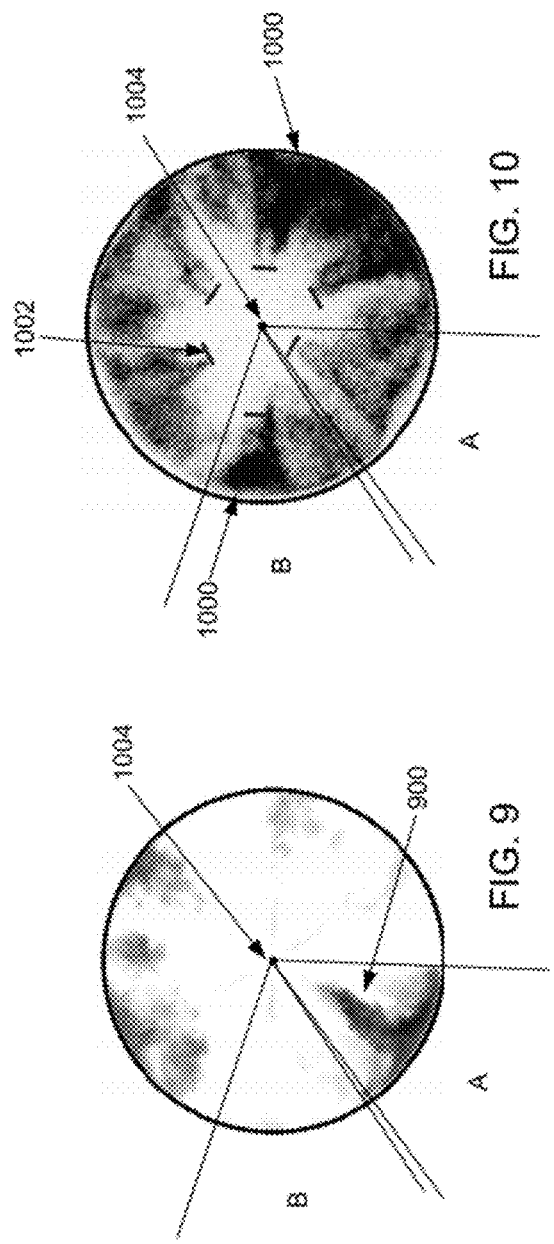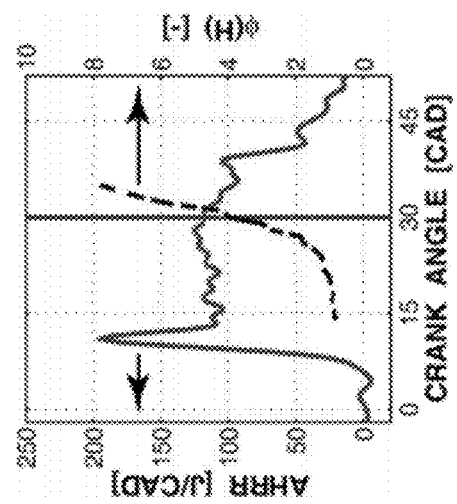
FIG. 10
FIG. 9
FIG. 11

DUCTED COMBUSTION CHAMBER FOR DIRECT INJECTION ENGINES AND METHOD

STATEMENT REGARDING FEDERALLY SPONSORED RESEARCH AND DEVELOPMENT

This disclosure was made in part with Government support pursuant to Funds in Agreement #083040921 in cooperation with the United States Government represented by the United States Department of Energy, and with Sandia National Laboratories. The United States Government may have certain rights in this disclosure.

TECHNICAL FIELD

This patent disclosure relates generally to internal combustion engines and, more particularly, to combustion chamber features for direct injection engines.

BACKGROUND

Most modern engines are direct injection engines, which means that each combustion cylinder of the engine includes a dedicated fuel injector configured to inject fuel directly into a combustion chamber. While direct injection engines represent an improvement in engine technology over past designs, in the form of increased engine efficiency and reduced emissions, the improvement of the design of any particular engine is always desirable, especially in light of increasing fuel costs and ever more strict regulations on engine emissions.

Various solutions have been proposed in the past for improving an engine's efficiency and reducing its emissions. One example of a previously proposed solution can be seen in Japanese Patent Application Publication No. JP1993272338A (05-272338) (the '338 application), which was published on Oct. 19, 1993. The '338 application, based on a machine translation, describes a piston forming a combustion chamber within a bowl feature thereof. The piston bowl includes recessed grooves extending radially away from a center of the piston that terminate along the outer periphery of the piston. Vertical ports formed in the outer periphery of the piston are fluidly open to the grooves such that fuel injected into the piston bowl is routed through the grooves and ports to an annular flat surface of the piston surrounding the bowl. According to the '338 application, the disclosed structure is aimed at suppressing combustion until a rich fuel mixture is provided at the outer margins of the piston to reduce NOx emissions and smoke. However, the structures disclosed in the '338 application require substantial machining or other material forming operations to define the various features of the disclosed embodiments.

SUMMARY

The disclosure describes, in one aspect, an internal combustion engine. The engine includes a crankcase or engine block having at least one cylinder bore and a cylinder head having a flame deck surface disposed at one end of the cylinder bore. A piston is connected to a rotatable crankshaft and configured to reciprocate within the cylinder bore. The piston has a piston crown portion facing the flame deck surface such that a combustion chamber is defined within the cylinder bore and between the piston crown and the flame deck surface. A fuel injector has a nozzle tip disposed in fluid communication with the combustion chamber. The nozzle tip has at least one nozzle opening configured to inject one or more fuel jets into the combustion chamber along corresponding fuel jet centerlines. At least one duct is defined in the combustion chamber between the piston crown and the flame deck surface. Each duct has a generally rectangular-shaped cross section, extends in the direction of fuel jet propagation, and encloses a portion of the fuel jet centerline.

In another aspect, the disclosure describes a ducted combustion system. The ducted combustion system includes a combustion chamber and a fuel injector configured to inject one or more fuel jets into the combustion chamber along corresponding fuel jet centerlines. Each duct having a generally rectangular-shaped cross section is disposed in the combustion chamber and receives therein its corresponding fuel jet. Each duct encloses a portion of its corresponding fuel jet centerline.

In yet another aspect, the disclosure describes a method for operating a combustion system. The method includes injecting one or more fuel jets along corresponding fuel jet centerlines into a combustion chamber. Each fuel jet is directed into a duct having a generally rectangular-shaped cross section such that local velocity gradients around the fuel jet create a more-uniform mixture of fuel from the fuel jet with the charge gas (e.g., air) present in the combustion chamber. Entrainment of recirculated combustion products from a downstream region of a fuel jet to an upstream region of a fuel jet is minimized by containing a portion of the upstream region of each fuel jet within its corresponding duct.

In yet another aspect, the disclosure describes a piston for use in an internal combustion engine. The piston includes a body portion connectable to a crankshaft of the engine. The body portion has a generally cylindrical shape defining a centerline. A crown portion is connected to the body portion and at least one pair of elongate fins is connected to the crown portion and extends away therefrom in a direction approximately parallel to the centerline. Each fin has a duct surface facing the other fin. Each duct surface extends away from the centerline in a generally radial direction relative to the crown portion, such that a duct having a generally U-shape is defined on the crown portion of the piston between two facing duct surfaces of the pair of fins and a bottom surface defined on the crown portion.

BRIEF DESCRIPTION OF THE DRAWINGS

FIG. 5 is a top view of two alternative embodiments, which are shown juxtaposed, for a piston in accordance with the disclosure.

FIGS. 6-8 are fragmentary cross sections illustrating four different embodiments for a piston in accordance with the present disclosure.

FIGS. 9 and 10 are snapshots of a combustion chamber during operation.

FIG. 11 is a graph in accordance with the disclosure.

DETAILED DESCRIPTION

This disclosure relates to internal combustion engines and, more particularly, to features incorporated within at least one combustion chamber of the engine to form a closed zone within which fuel, such as diesel, another fuel or a mixture of different fuels, is injected and ignited during engine operation. In general, the various features disclosed herein advantageously accomplish lower exhaust emissions and higher efficiencies from direct injection internal combustion engines and burners. The features primarily include ducts, which in one embodiment are formed by walls or wall portions that protrude up from a piston head and/or down from a combustion chamber surface of a cylinder head. Each of the ducts forms a passageway corresponding to a nozzle opening of a fuel injector disposed to inject fuel directly into the combustion chamber. By channeling the fuel from the fuel injector into each respective duct, improved fuel combustion is achieved because the upstream regions of a direct injection fuel jet are affected by faster and more uniform premixing as well as by an inhibition of entrainment of combustion products from downstream regions of the same or neighboring jets, as is set forth in more detail hereinafter.

Figure 1:
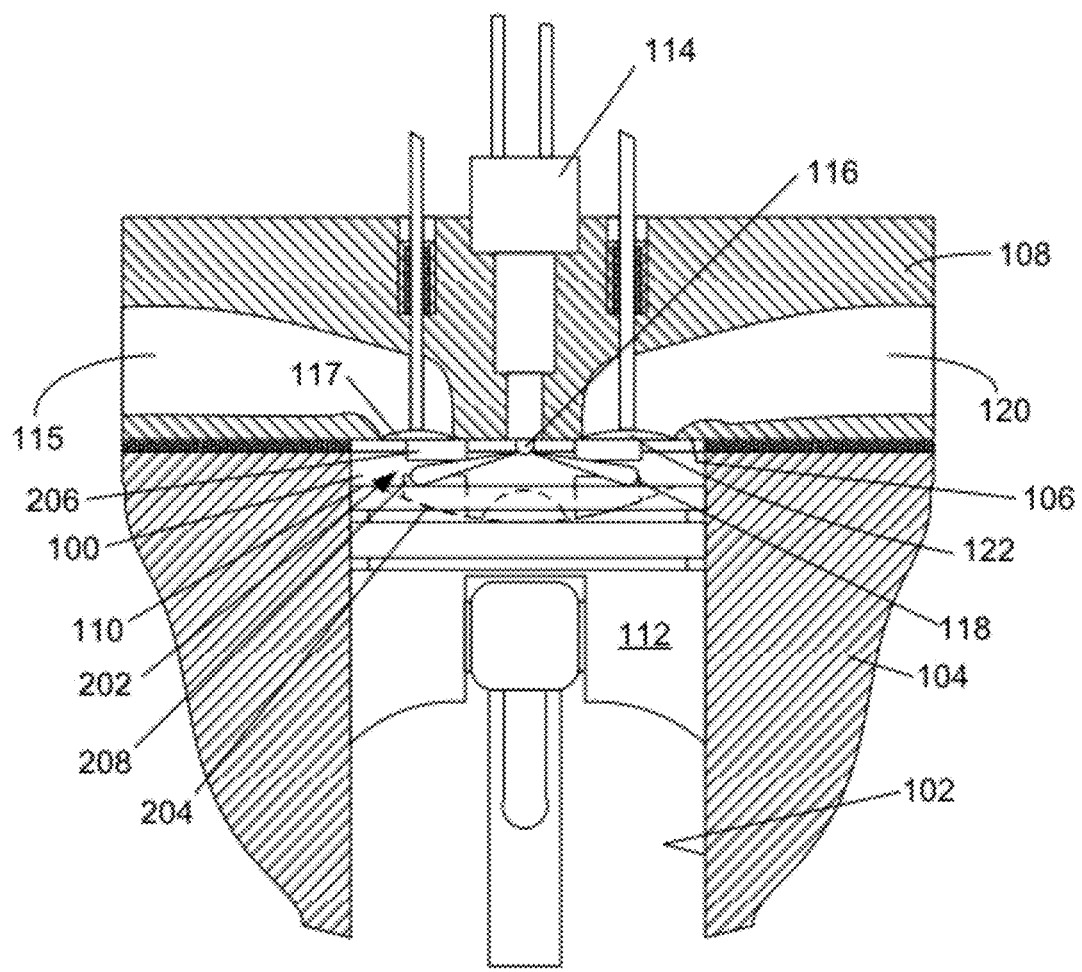
FIG. 1 is a cross section of an engine combustion chamber in accordance with the disclosure.

A cross section of a combustion chamber 100 of an engine 101 in accordance with the disclosure is shown in FIG. 1. The combustion chamber 100 has a generally cylindrical shape that is defined within a cylinder bore 102 formed within a crankcase or engine block 104 of the engine. The combustion chamber 100 is further defined at one end by a flame deck surface 106 of a cylinder head 108, and at another end by a piston crown 110 of a piston 112 that is reciprocally disposed within the bore 102. A fuel injector 114 is mounted in the cylinder head 108. The injector 114 has a tip 116 that protrudes within the combustion chamber 100 through the flame deck surface 106 such that it can directly inject fuel therewithin.

During operation of the engine 101, air is admitted into the combustion chamber 100 via an air inlet passage 115 when one or more intake valves 117 (one shown) are open during an intake stroke. In a known configuration, high pressure fuel is permitted to spray through nozzle openings in the tip 116. Each nozzle opening creates a fuel jet 118 that generally disperses to create a predetermined fuel/air mixture, which in a compression ignition engine auto-ignites and combusts. Following combustion, exhaust gas is expelled from the combustion chamber through an exhaust conduit 120 when one or more exhaust valves 122 (one shown) is/are open during an exhaust stroke.

The uniformity and extent of fuel/air mixing in the combustion cylinder is relevant to the combustion efficiency as well as to the amount and type of combustion byproducts that are formed. For example, fuel-rich mixtures, which may be locally present within the combustion chamber 100 during a combustion event due to insufficient mixing, may lead to higher soot emissions and lower combustion efficiency. In the illustrated embodiments, more-uniform fuel/air mixing is managed for each fuel jet by use of mixing ducts of generally rectangular or U-shaped cross-section defined between the piston crown 110, the flame deck surface 106, and at least one pair of fins as described and shown relative to the various embodiments presented herein.

Figure 2:
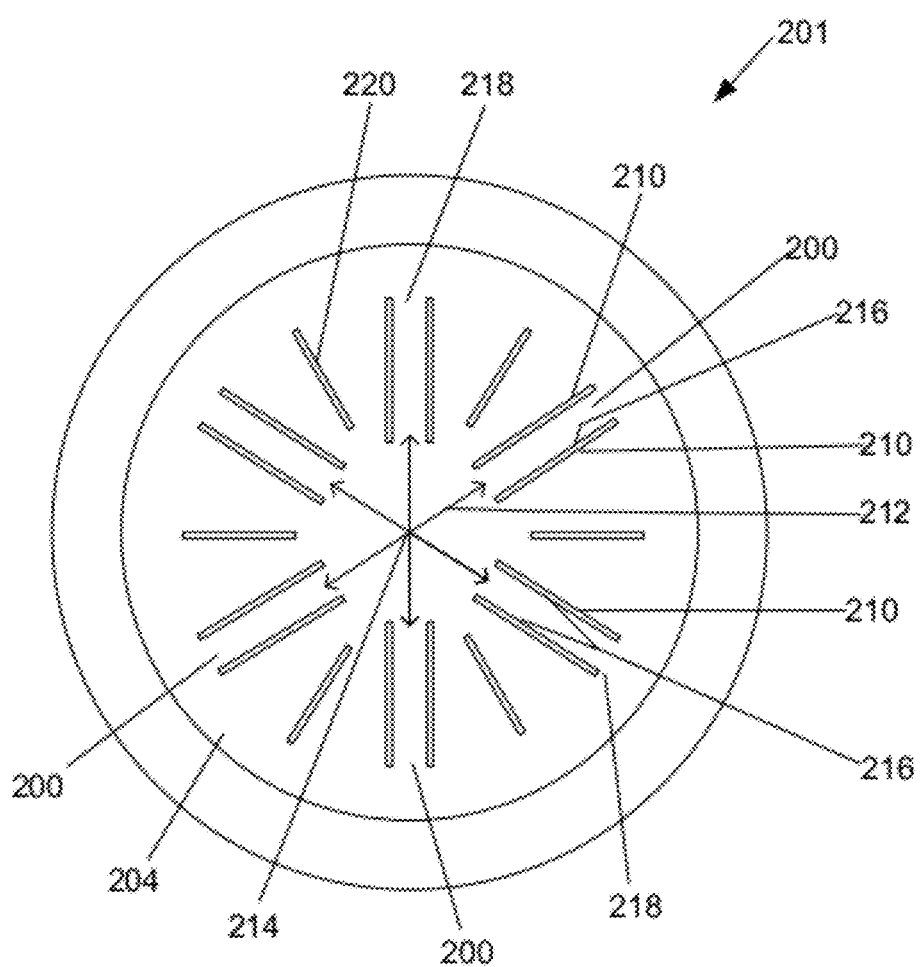
FIG. 2 is a top view of an engine piston in accordance with the disclosure.

In further reference to FIG. 2, a plurality of ducts 200 is defined in a flame region 202 (FIG. 1) of the combustion chamber 100. The flame region 202 extends over a space that is generally proximate to the top of the piston crown 110, a combustion bowl 204 that may optionally be formed in the piston crown 110, and a space that is proximate to the flame deck surface 106 of the cylinder head 108 when the piston 112 is close to a maximum compression distance or top dead center (TDC) position. In the embodiment shown in FIG. 1, top fins 206 or walls extend in a downward direction from the flame deck surface 106 and/or intake valve 117 or exhaust valve 122 surfaces into the flame region 202 of the combustion chamber 100. In a similar fashion, piston fins 208 extend in an upward direction from the piston crown 110 into the flame region 202 of the combustion chamber 100. The top fins 206 and piston fins 208 have appropriate lengths and positions such that they do not interfere with each other or the motion of the piston 112 in the bore 102. The ducts 200 as shown and described hereinafter may be defined between top fins 206, piston fins 208, or any combination thereof. In the figures that follow, the fins illustrated are piston fins 208 for simplicity of description and illustration, but in each embodiment the same implementation is contemplated to encompass top fins 206 in addition to or instead of the illustrated piston fins 208.

With the foregoing in mind, one embodiment for a piston 201 is shown in FIG. 2 from a top perspective. The piston 201 includes six ducts 200, each duct being defined between two adjacent fins 210. The ducts 200 extend radially relative to the piston 201 and are approximately equally spaced on the surface of the piston 201. Each duct 200 is configured to be aligned with a particular fuel jet (118, as shown in FIG. 1), which in this embodiment is shown schematically as an arrow 212 emanating from a center point 214 representing a point on the centerline of the piston crown as well as a location of the injector tip (116, as shown in FIG. 1). Therefore, six ducts 200 are shown for an injector providing six fuel jets, but any other number of ducts may be used to correspond to one or more of the jets provided by any other particular injector.

As can be seen in FIG. 2, each fuel jet 212 is configured to enter into a corresponding duct 200. As fuel passes through each duct 200, local velocity gradients in the vicinity of each fuel jet increase, which leads to higher mixing rates. More specifically, the velocity gradients are increased because the gases next to the inner wall 216 of each fin 210 are assumed to have a no-slip condition or a zero bulk velocity. This velocity gradient is conducive to producing more-uniform mixing of the fuel in each fuel jet with charge-gas present in the duct such that the resulting mixture near each duct outlet 218, which is disposed radially outward relative to the center point 214, will be relatively uniform because little to no further entrainment will occur while the fuel/air mixture is formed within the duct 200.

In the same way, entrainment of combustion products between downstream and upstream regions of the fuel jet and resulting mixture during combustion is avoided. It has been found that the entrainment of combustion products in this way can lead to a decreased distance between the fuel injector orifice exit and the combustion zone, which is commonly referred to as the flame lift-off length. Decreased lift-off lengths correspond to higher local equivalence ratios near the lift-off length, which correspond to more fuel-rich mixtures that are locally present at the lift-off length. Higher equivalence ratios at the lift-off length have been observed to lead to higher soot emissions.

After this phenomenon was observed using soot and combustion luminosity imaging, it was determined that the ducts' function in further inhibiting the entrainment of combustion products into upstream regions of the jet by directly blocking this entrainment resulted in a lower (i.e., more fuel-lean) and more-uniform equivalence ratio at the lift-off length. Relative to the embodiment shown in FIG. 2, an additional array of combustion gas directing fins 220 are interposed between adjacent ducts 200. As shown, the directing fins 220, which are optional, may extend radially away from the center 214 and are arranged symmetrically around the piston 201 disposed in equal radial distances between the plurality of ducts 200. The directing fins 220 operate to slow down combustion gases during combustion as those gases travel from downstream or radially outward locations towards upstream or radially inward locations of each jet 212.

Figure 3:
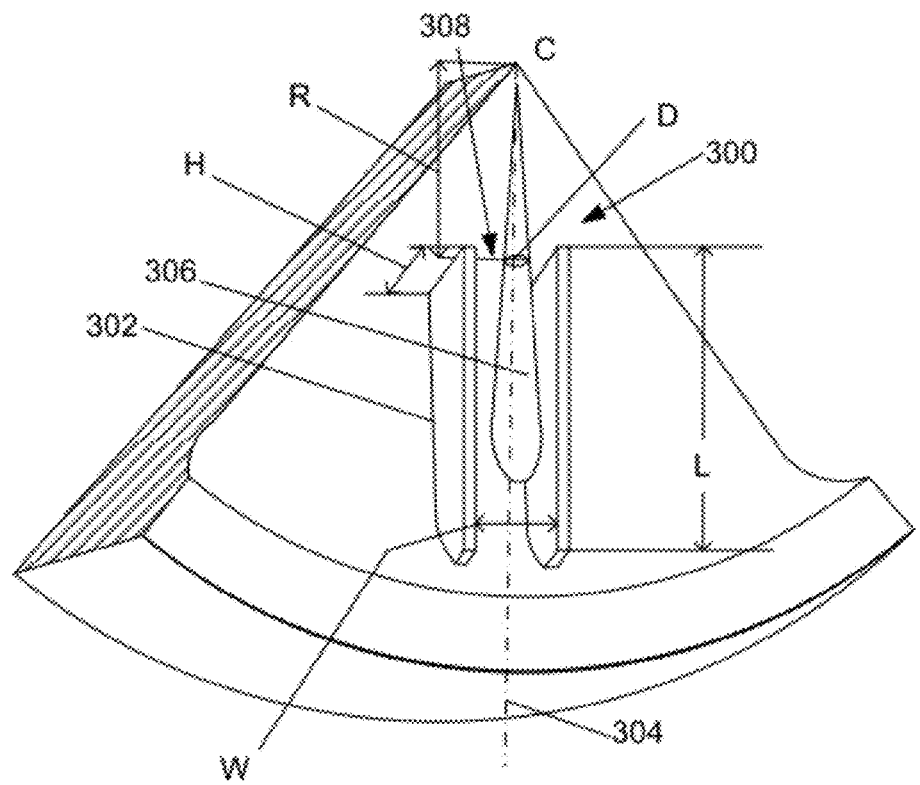
FIGS. 3 and 4 are fragmentary views from a top perspective of two alternative embodiments for pistons in accordance with the disclosure.
Figure 4:
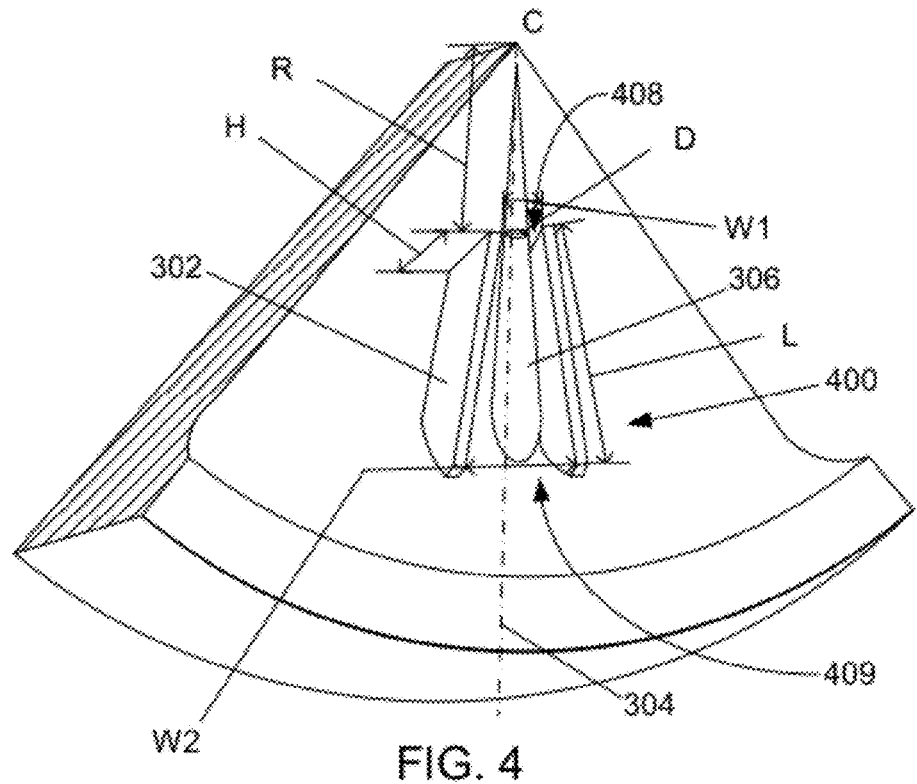

FIGS. 3 and 4 represent fragmentary views from the top perspective of two alternative embodiments for duct configurations. A duct 300 shown in FIG. 3 is defined between two fins 302 that extend parallel to one another at equal distances from a radial axis 304 that substantially coincides with a flow direction of a fuel jet 306. While specific dimensions of the duct 300 will generally depend on engine application parameters, such as bore size, cylinder displacement, injector jet dispersion, number of fuel jets, crankshaft position range during injection, and the geometry of the piston bowl and the flame deck surface of the cylinder head, certain dimensional and/or geometric relationships can be used to provide advantageous results. For example, the equidistant placement of the fins 302 around the fuel jet 306 can insure that the duct 300 is substantially aligned with the fuel jet 306.

The duct 300 has a generally rectangular U-shaped cross section defined by a width, W, and a height, H, as shown in FIG. 3. A length, L, of the duct 300 extends radially along the axis 304 between the two endpoints of the duct 300. A duct inlet is disposed at a radial distance, R, from a centerpoint, C, of the piston. The fuel jet 306 has a diameter, D, at the plane of entry into the duct 300. A hydraulic diameter, DH, of the duct 300 can be calculated in the known fashion and, in some cases, can be approximated as about equal to $2 \times H \times W/(H+W)$ for a rectangular duct.

In the embodiment shown in FIG. 3, the minimum cross sectional area of the duct inlet 308, which is disposed on the radially inward end of the duct 300, is selected to be between 3 and 10 times the cross sectional area of the fuel jet 306 at the duct inlet 308, which in this case would be calculated as $\pi(D/2)^2$. The length L of the duct 300 is selected to be 1 to 8 times the minimum hydraulic diameter of the duct inlet 308. The radial position R of the duct inlet 308 is selected to be about 0.75 to 3 times the minimum hydraulic diameter DH of the cross sectional area of the duct inlet 308.

As can be seen in FIG. 3, the cross sectional area of the duct 300 is maintained substantially unchanged along its length. However, the cross sectional area may be increased in the direction radially away from the center point C. In the alternative embodiment, a duct 400 as shown in FIG. 4 incorporates an increasing cross sectional area as shown. In the embodiment shown in FIG. 4, features and elements that are the same or similar to corresponding features and elements already described are denoted by the same reference numerals or indicators as previously used for simplicity.

Accordingly, the fins 302 of the duct 400 are disposed at an angle relative to one another such that the cross sectional area of the duct 400 increases in a direction radially away from the center point C. More specifically, the duct 400 has a first width, W1, at its inlet 408, which increases to a second width, W2, at its outlet 409. In this way, the cross sectional area of the duct 400 increases along its length L. The rate of increase of the cross sectional area of the duct 400 can be selected to be less than 100% over a portion of the length L that is about equal to a hydraulic diameter at the inlet 408.

The function of the ducts 200, 300 and 400 already described relies generally on an open channel formed between adjacent fins that generally encompasses a fuel jet, and which directs the fuel jet in a radially outward direction relative to the piston. Although fins have been used in the embodiments described thus far, other structural configurations or variations may be used to accomplish the effect of promoting mixing of the fuel in a fuel jet and directing a more-uniform fuel/air mixture towards the outer margins of the combustion chamber as previously described. Accordingly, an alternate embodiment of a piston 500, a semicircular portion of which is illustrated juxtaposed with a semicircular portion of the piston 201 (FIG. 2), is shown in FIG. 5 to illustrate at least some of the similarities and differences between the two embodiments. Detailed section views of the piston 500 and the piston 201 are shown in FIGS. 6 and 8, respectively. FIG. 7 illustrates a partial cross section of yet another alternate embodiment. In the various views of FIGS. 5-8, features and elements that are the same or similar across the various views are denoted by the same reference numerals for simplicity.

As previously described, the piston 201 includes pairs of fins 210 that are disposed within the piston bowl 204 and extend in an upward direction therefrom to define the ducts 200. As is best seen in FIG. 8, the fins 210 may be connected or integral with the piston 201 along a bottom portion of the bowl 204. The duct 200 is defined between the fins 210. Each fin 210 may include a substantially vertical wall 802 laterally defining the duct 200 and a slanted wall 804, which provides structural strength at the base of each fin 210. Moreover, a valley portion 806 of each duct 200 may be curved along its length to avoid the formation of sharp corners that may compromise the structure of the fins 210 under stress, such as thermal stresses caused by temperature gradients during operation.

The fins 210 may be formed by a forging process that forms other features of the piston 201, in which case the various generally vertical faces of the fins 210 may be disposed at a slight release angle relative to vertical in the orientation shown in FIG. 8, or may alternatively be formed by a secondary machining process that removes material to define the various features of the duct 200 and the surrounding structures. Alternatively, the fins 210 and/or top surface of the piston bowl 204 also may be created using high temperature materials such as ceramics and/or metallic alloys (e.g., inconel). In one embodiment, the fins 210 may be formed together as an insert, 808, that is inserted into a groove or the top surface of the piston and connected thereto along an interface surface 810, as shown in dashed lines in FIG. 8. Each insert 808 may include a single fin or pairs of fins forming at least partially a U-shaped channel.

Turning now to the piston 500, which is shown in the left side of FIG. 5, and to the corresponding detailed cross section thereof, which is shown in FIG. 6, it can be seen that the ducts 502 of the piston 500 are defined by channels that are formed along a bottom portion of the piston bowl 504, but are otherwise positioned and operate similarly to the ducts 200 of the piston 201. As is best shown in FIG. 6, each duct 502 has a generally rectangular cross section defined by two lateral walls 506 and a bottom wall 508 that are part of each channel formed in the bottom surface 510 of the piston bowl 504. The top portion of each duct may be provided by top fins extending downward from e.g., the flame deck surface of the cylinder head (not shown here) when the piston 500 is close to a top dead center position, as previously described. Rounded fillets 512 may be included along the intersections between the vertical walls 506 and the bottom wall 508 of each duct 502 to avoid stress concentration areas.

An alternative embodiment for a duct 700 is shown in FIG. 7. In this embodiment, a hybrid type of construction is used to form the duct 700. That is to say, a shallow channel 702 is formed in the bottom surface 704 of the piston bowl 706. Partial fins 708 extend upward in the orientation of FIG. 7 alongside the vertical walls 710 of the channel 702 to increase the cross sectional area of the duct 700. Thus, in a fashion similar to the other disclosed embodiments, the duct 700 has a generally rectangular cross section having a U-shaped portion that is connected to or formed integrally with the piston crown and that is defined between two substantially vertical walls 712 and a bottom wall 714.

INDUSTRIAL APPLICABILITY

The present disclosure is not only applicable to internal combustion engines having reciprocating pistons, as described relative to the embodiments illustrated herein, but also to other types of applications, such as gas turbines, industrial burners and the like. In general the various ducts described herein are effective in promoting faster and more uniform premixing of fuel and air in the combustion chambers of engines, and inhibit the entrainment of recirculated combustion products from downstream regions into upstream regions of a fuel jet injected into the combustion chamber.

Two snapshots illustrating combustion regions and soot formation within an engine cylinder during operation are shown in FIGS. 9 and 10, and a qualitative graph showing combustion energy release rate and equivalence ratio at the lift-off length for the same engine versus crankshaft angle is shown in FIG. 11. The information illustrated in FIGS. 9 and 10 was acquired during engine operation on an experimental engine test setup. Each of FIGS. 9 and 10 is a snapshot of an engine cylinder taken from the viewpoint of looking up into the cylinder bore through a window in the piston bowl during a combustion event. FIG. 9 represents soot formation (black regions 900) that was visualized using imaging of soot incandescence, and FIG. 10 represents the combustion regions (dark areas 1000) that were visualized using imaging of chemiluminescence from electronically excited hydroxyl radicals. In FIG. 10, the flame lift-off length relative to each of six injector nozzle openings, each of which provides a fuel jet, are illustrated by bars 1002 that are disposed at various radial distances from the injector tip 1004. A large radial distance of each bar 1002 from the injector tip 1004 represents a large flame lift-off length. Both FIG. 9 and FIG. 10 represent a condition with an engine crankshaft position of approximately 30 degrees after top dead center.

Based on the snapshots of FIGS. 9 and 10, the relationship between flame lift-off and soot formation was analyzed by comparing different regions of the cylinder to one another. More specifically, a first segment, A, of the cylinder, which is located at about the 7 o'clock position, operates at the instant the snapshot was taken at a relatively small flame lift-off length as compared to that of a second segment, B, which is located at about the 9 o'clock position. By comparing the location of the respective bars 1002 in the A and B regions, it can be seen that the flame lift-off is smaller in segment A than it is in segment B. As a consequence of the smaller flame lift-off length, segment A of the cylinder also operates at a higher equivalence ratio, which as indicated by FIG. 9 causes soot to form in the region 900 within segment A. In contrast, the relatively high flame lift-off in segment B causes far less soot to form within segment B.

A qualitative relationship between apparent heat release rate (AHRR, expressed in J/Crankshaft Angular Displacement (CAD) and shown as a solid line in FIG. 11) and equivalence ratio at the lift-off length (denoted $\phi(H)$ and shown as a dashed line in FIG. 11) versus crankshaft angle displacement after top dead center (CAD, expressed in degrees) is shown in FIG. 11. As can be seen from the graph, although the heat released by combustion is relatively uniform for a range of about 15 to 40 degrees after top dead center, the equivalence ratio at the lift-off length tends to drastically increase from about 20 CAD after TDC to the end of the fuel injection event. It is in this period of combustion that soot, such as the soot shown in FIG. 9, forms.

The ducted combustion arrangements disclosed herein are advantageously configured to accomplish improved premixing and to direct combustion away from the injector such that higher flame lift-off lengths can be achieved. Moreover, the disclosed embodiments are further configured to maintain low equivalence ratios at the lift-off length by discouraging the recirculation of combustion products. Regarding the recirculation and entrainment of combustion products into the fuel jet, it has been found that the ducts will operate to maintain a lower equivalence ratio of combustion at the lift-off length and thus produce lower engine-out soot emissions. It is expected that the more uniform premixing coupled with the inhibition of recirculation of combustion products will enable the creation of equivalence ratios at the lift-off length of less than approximately 2 within distances that are less than typical piston bowl radii using typical injector orifice diameters and injection pressures. Mixtures with equivalence ratios less than 2 generally do not produce soot, so a main benefit of the ducts and other configurations disclosed herein will be reduced engine-out soot emissions. Moreover, the more-uniform premixing can lead to a smaller portion of the fuel mass injected into the combustion chamber reacting in regions that are overly lean or overly rich, which in turn is expected to increase efficiency while also reducing hydrocarbon and carbon monoxide emissions. Nitrogen oxide emissions may also be reduced because the ducts and related structures disclosed herein can be configured to better control the evolution of mixture temperature and species concentrations during combustion.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. An internal combustion engine, comprising:
an engine block having at least one cylinder bore;
a cylinder head having a flame deck surface disposed at one end of the cylinder bore;
a piston connected to a rotatable crankshaft and configured to reciprocate within the cylinder bore, the piston having a piston crown portion facing the flame deck surface such that a combustion chamber is defined within the cylinder bore and between the piston crown and the flame deck surface;
a fuel injector having a nozzle tip disposed in fluid communication with the combustion chamber, the nozzle tip having a plurality of nozzle openings configured to inject a plurality of fuel jets into the combustion chamber, each of the plurality of fuel jets travelling along a respective fuel jet centerline;

a plurality of ducts defined in the combustion chamber between the piston crown and the flame deck surface, each duct having a generally rectangular cross section, and extending in a radial direction relative to the cylinder bore substantially along a segment of a respective fuel jet centerline.

2. The internal combustion engine of claim 1, wherein each of the plurality of ducts is at least partially defined by a pair of fins having an elongate shape that includes sidewalls extending substantially parallel to a centerline of the cylinder bore, and wherein each of the plurality of ducts is at least partially defined between two opposing sidewalls disposed to at least partially enclose the segment of the respective fuel jet centerline.

3. The internal combustion engine of claim 2, wherein at least one fin of the pair of fins is connected to the piston crown.

4. The internal combustion engine of claim 2, wherein at least one fin of the pair of fins is connected to at least one of the flame deck surface of the cylinder head, an intake valve, and an exhaust valve.

5. The internal combustion engine of claim 2, wherein two fins of the pair of fins are connected to one another to form a U-shaped insert that is connected to the piston crown.

6. The internal combustion engine of claim 5, wherein the piston crown portion further includes a piston bowl having a generally concave shape and wherein each of the plurality of ducts has an inlet and an outlet that are radially disposed within the piston bowl.

7. The internal combustion engine of claim 1, wherein each of the plurality of ducts is partially formed as a groove in the piston crown portion and at least partially formed between two walls extending parallel to one another around a portion of the fuel jet.

8. The internal combustion engine of claim 1, further comprising at least one recirculation inhibiting surface defined on a fin disposed between the piston crown and the flame deck surface, the fin having an elongate shape such that the at least one recirculation inhibiting surface is substantially parallel to a centerline of the cylinder bore and disposed between two adjacent ducts.

9. The internal combustion engine of claim 1, wherein a cross sectional area of an inlet of each of the plurality of ducts is between 3 and 10 times a cross sectional area of the fuel jet.

10. The internal combustion engine of claim 1, wherein a length of each of the plurality of ducts along the fuel jet centerline is between 1 and 8 times a minimum hydraulic diameter of an inlet cross section of each of the plurality of ducts.

11. The internal combustion engine of claim 1, wherein an inlet of each of the plurality of ducts is disposed at a radial distance from a centerline of the cylinder bore that is about 0.75 to 3 times a minimum hydraulic diameter of an inlet cross section of the respective duct.

12. The internal combustion engine of claim 1, wherein a cross sectional area of each of the plurality of ducts increases in a radial direction away from a centerline of the cylinder bore at a rate of not more than 100% over a length of the at least one duct along the fuel jet centerline that is about equal to a hydraulic diameter of an inlet cross section of the respective duct.

13. A piston for use in an internal combustion engine, comprising:

a body portion connectable to a crankshaft of the engine, the body portion having a generally cylindrical shape defining a centerline;

a crown portion connected to the body portion;

at least one pair of elongate fins connected to the crown portion and extending away therefrom in a direction of the centerline, each fin of the at least one pair of elongate fins having a duct surface facing the other fin, the duct surface extending away from the centerline in a generally radial direction relative to the crown portion;

wherein a duct having a generally U-shaped cross section is defined on the crown portion of the piston between two facing duct surfaces of the at least one pair of fins and a bottom surface defined on the crown portion.

\* \* \* \* \*